United States Patent [19]

Keesman

[11] Patent Number: 5,729,293
[45] Date of Patent: Mar. 17, 1998

[54] METHOD AND DEVICE FOR TRANSCODING A SEQUENCE OF CODED DIGITAL SIGNALS

[75] Inventor: Gerrit J. Keesman, Eindhoven, Netherlands

[73] Assignee: U.S. Philips Corporation, New York, N.Y.

[21] Appl. No.: 496,344

[22] Filed: Jun. 29, 1995

[30] Foreign Application Priority Data

Jun. 30, 1994 [FR] France ............... 94 08105
Sep. 2, 1994 [FR] France ............... 94 10583

[51] Int. Cl.$^6$ ........................................ H04N 7/36
[52] U.S. Cl. ........................... 348/401; 348/409
[58] Field of Search ........................... 348/384, 390, 348/400, 401, 403, 409, 415; 382/233, 236, 238, 248, 250

[56] References Cited

U.S. PATENT DOCUMENTS

| | | | |
|---|---|---|---|
| 5,270,812 | 12/1993 | Richards | 348/415 |
| 5,287,420 | 2/1994 | Barrett | 382/233 |
| 5,291,283 | 3/1994 | Kondo et al. | 348/415 |
| 5,294,974 | 3/1994 | Naimpally et al. | 348/395 |
| 5,510,787 | 4/1996 | Koster | 348/415 |

*Primary Examiner*—Amelia Au
*Attorney, Agent, or Firm*—Laurie E. Gathman

[57] ABSTRACT

A device for transcoding coded digital signals which are representative of a sequence of images, which device comprises a variable length decoding channel (12) followed by a variable length encoding and decoding channel (13), is described. According to the invention, a prediction sub-assembly (140) is connected in cascade between these two channels, and this sub-assembly comprises, in series, between two subtracters (114, 45), a picture memory (41) and a circuit (42) for motion compensation in view of displacement vectors which are representative of the motion of each image. Other implementations are possible, and particularly a scalable one in which said prediction sub-assembly comprises at least two and more generally a plurality of similar encoding and decoding channels arranged in cascade and corresponding to the same number of image quality levels.

11 Claims, 5 Drawing Sheets

METHOD AND DEVICE FOR TRANSCODING A SEQUENCE OF CODED DIGITAL SIGNALS

BACKGROUND OF THE INVENTION

The invention relates to a method of transcoding coded digital signals corresponding to a sequence of images and to modifications of this method. It aim relates to a transcoding device for implementing this method or its modifications.

Transcoding is herein understood to mean the operation of convening a stream of data having a given bitrate into another stream of data having a different bitrate. The invention is particularly suitable for transcoding data streams in conformity with the MPEG standard (acronym for "Moving Picture Experts Group", which is a group of experts of the International Standardization Organisation ISO established in 1990and which has adopted this standard for transmitting and/or storing animated images, which standard has since been published in numerous documents by the ISO). The MPEG standard is for instance described in the article "MPEG: A Video Compression Standard for Multimedia Applications", D. Le Gall, published in "Communications of the ACM", April 91, vol.34, no4, pp.46–58.

The problem of transcoding may occur in situations where one means of signal transport interfaces another means of signal transport. For instance if an MPEG compressed video signal at say 9 Mbits/second (such as transmitted by a satellite) must be relayed at a cable head end with a limited cable capacity, the cable head-end will relay this incoming signal at a lower bit-rate, say 5 Mbits/second. The specific transcoding problem is therefore referred to as bit-rate conversion, and basically a transcoder will consist of a cascaded decoder and encoder.

The document U.S. Pat. No. 5,294,974 refers to the conventional structure of an encoder which is compatible with this MPEG standard and an example of such a structure is copied in the present FIG. 2, while FIG. 1 shows an example of a conventional decoder of the MPEG type.

Figure 1:
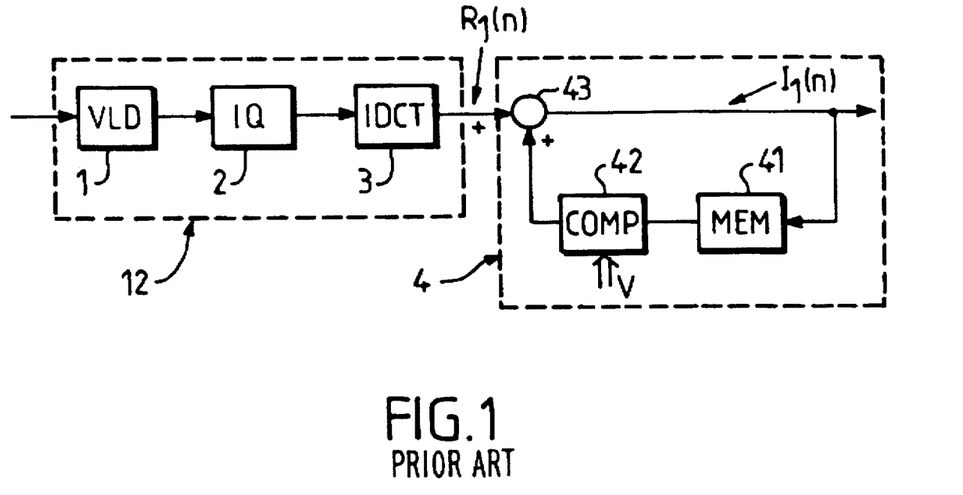
FIGS. 1 and 2 show conventional examples of a decoder and an encoder which are compatible with the MPEG standard.

The decoder shown in FIG. 1 comprises a decoding channel 12 which comprises, in cascade, a variable length decoding circuit 1, an inverse quantizing circuit 2 (denoted VLD and IQ so as to facilitate reading of the Figure) and an inverse frequency transform circuit (in the further description, said circuit is, for example, an inverse orthogonal transform circuit such as an inverse discrete cosine transform circuit 3, denoted IDCT). The decoder comprises also, in cascade with this channel, a motion compensation stage 4 comprising, in series, a picture memory 41 receiving the output signals from the decoder, a motion compensation circuit 42 based on the output signals of this memory 41 and motion vectors V received by the decoder at the same time as the coded signals (and which have been transmitted and/or stored), and an adder 43 for the output signals of the inverse discrete cosine transform circuit 3 and of the circuit 42, the output of this adder constituting both the output of the decoder and the input of the memory 41. For the same reason as mentioned hereinbefore, the memory 41 and the circuit 42 are denoted MEM and COMP, respectively, in FIG. 1.

Figure 2:
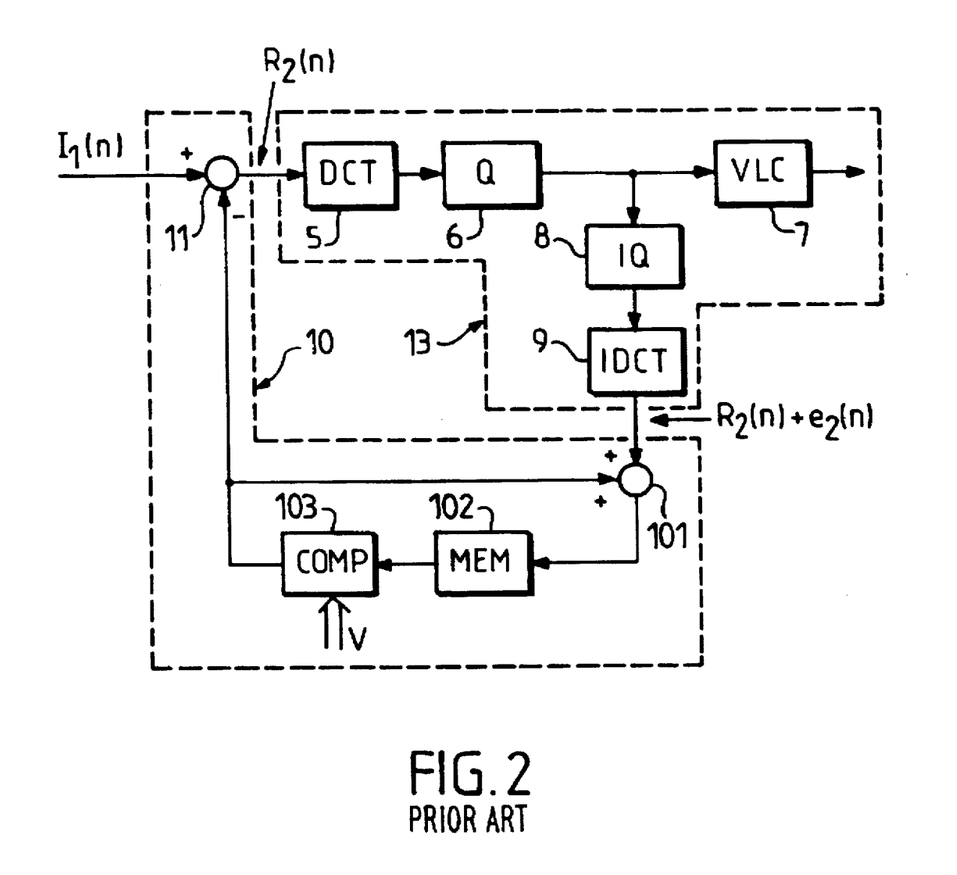

The encoder shown in FIG. 2 comprises an encoding and decoding channel 13 and a prediction channel 10. The encoding and decoding channel comprises, in cascade, a frequency transform circuit (as previously, in the further description this circuit is, for example, an orthogonal transform circuit such as a discrete cosine transform circuit 5), a quantizing circuit 6 and a variable length encoding circuit 7 (denoted DCT, Q and VLC, respectively), and at the output of the circuit 6, in cascade, an inverse quantizing circuit 8 and an inverse frequency transform circuit (for example, an inverse orthogonal transform circuit such as an inverse discrete cosine transform circuit 9), denoted IQ and IDCT, respectively. In the following description, the output of the circuit 7 will be referred to as encoding output and constitutes the output of the transcoder, while the output of the circuit 9 will be referred to as predicting output and constitutes the input of the prediction channel. The prediction channel consists of a sub-assembly comprising, in cascade, an adder 101 for reconstructing the blocks (in this example the original video signals corresponding to a sequence of animated images have been subdivided into blocks of the same size each comprising m×n pixels), a picture memory 102, a motion compensation circuit 103 based on previously estimated motion vectors (the memory 102 and the circuit 103 are denoted MEM and COMP, respectively), and a subtracter 11 whose positive input receives the input signals of the encoder and whose negative input receives the output signals of the circuit 103, so that only the difference between these signals is coded. The adder 101 receives this output signal from the circuit 103 and the predicting output signal from the encoding and decoding channel.

Figure 3:
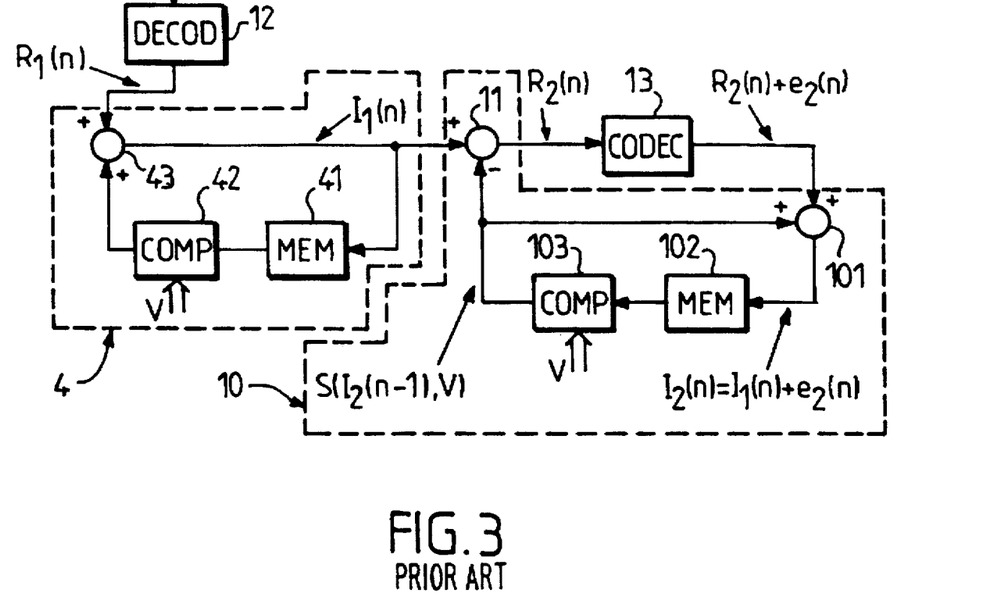
FIG. 3 shows the conventional structure of a transcoding device comprising in cascade such a decoder and encoder.

A transcoder assembly resulting from the association of these decoder and encoder is shown in FIG. 3, which can be simplified for the entire further description by replacing the circuits 1, 2, 3 of the decoder (VLD, IQ, IDCT) by the element which is equivalent thereto, the channel 12, and which is denoted DECOD. Similarly, for simplifying the Figure, the circuits 5, 6, 7, 8, 9 in the encoder are replaced by the element which is substantially equivalent thereto, the channel 13, and which is denoted CODEC, while, as sated hereinbefore, the outputs of the circuits 7 and 9 are referred to as encoding output and predicting output, respectively. The cost of the transcoding method and device thus described notably depends on some components, such as the picture memories.

SUMMARY OF THE INVENTION

It is therefore an object of the invention to provide a transcoding method similar to the method which has been described, but which is simpler and less expensive to implement.

To this end the invention relates to a method of transcoding coded digital signals corresponding to a sequence of images, which method comprises a decoding step of the input digital signals which are associated with each current image, followed by an encoding step, said method being characterized in that it also comprises, between said decoding and encoding steps, a prediction step comprising in cascade:

(a) a first subtracting sub-step provided for determining an encoding error during said encoding step;

(b) a storing sub-step of said encoding error;

(c) a motion compensation sub-step between said current image and a previous image;

(d) a second subtracting sub-step between the decoded signals obtained after said decoding step and the motion-compensated signals obtained after said motion compensation sub-step, the output of said second subtracting sub-step corresponding to the input of said encoding step.

By combining a decoder and an encoder in a more efficient way, the transcoding structure thus constituted benefits from a remarkable reduction of complexity with respect to the pure and simple association of a complete decoder and a complete encoder. The invention is mainly based on the fact that the decoder uses, for example, motion vectors which may be re-used in the subsequent encoder, which provides the possibility of omitting the motion estimation circuit normally arranged in the encoder (if the structure in the form of groups of pictures in accordance with the MPEG standard is the same for the data stream entering the transcoder and for the data stream leaving it). Such a lack of needing to estimate motion vectors reduces the computational complexity of the transcoding device significantly. Similarly, in the case of the MPEG standard, the images may be coded in different modes: the encoder then re-uses the decision as such, used in the decoder, relating to the choice of image encoding or field encoding. It is also known that, within a group of pictures, the order according to which the pictures are sent to the encoder is modified in order to allow pictures of B type to be predicted (these pictures are predicted thanks to a bidirectional motion compensation using a previous picture and a following picture). These pictures of B type are delayed by two picture periods and this modified order is used for the transmission, the original order being restituted only at the decoder output. In the present case of a transcoding structure with an encoder following a decoder, it is simpler not to provide for such a picture re-ordering at the decoder output, since a further picture ordering has to be provided for in the encoder. Finally it can be observed that there is no need to have decoded picture available in the transducing device because most of its input data can be copied from the decoder to the encoder: the amount of memory for storing the previously decoded pictures is therefore reduced.

According to another implementation, the invention also relates to a method of transcoding coded digital signals corresponding to a sequence of images, which method comprises a decoding step of the input digital signals which are associated with each current image, followed by an encoding step, said method being characterized in that it also comprises, between said decoding and encoding steps, a prediction step comprising in cascade:

(a) a first subtracting sub-step provided for determining an encoding error during said encoding step;

(b) a first sub-step for converting frequential signals into spatial signals;

(c) a storing sub-step of the signals obtained after said first convening sub-step;

(d) a motion compensation sub-step between the current image and a previous image;

(e) a second sub-step for converting spatial signals into frequential signals (f) a second subtracting sub-step between the decoded signals obtained after said decoding step and the signals obtained after said second converting sub-step, the output of said second subtracting sub-step corresponding to the input of said encoding step.

Moreover, in the case of image distribution according to two or more image quality levels, such a method can then be characterized in that it also comprises at least one additional encoding step, the whole number of encoding steps corresponding to a desired number of image quality levels.

Another object of the invention is to provide implementations of such transcoding methods, leading to transcoding structures which are simpler and less expensive than conventional implementations with a complete decoder and a complete encoder in cascade.

To this end the invention relates first to a device for transcoding coded digital signals corresponding to a sequence of images, which device comprises in cascade:

(A) a decoding sub-assembly for decoding input signals of said device which are associated with each current image;

(B) an encoding sub-assembly with an encoding output and a predicting output; said device being characterized in that it also comprises:

(C) between the output of said decoding sub-assembly and the input of said encoding sub-assembly, a prediction sub-assembly comprising:

(a) a first subtracter, the positive and negative inputs of which are respectively connected to the predicting output and to the input of said encoding subassembly, and a second subtracter, the positive input and the output of which are respectively connected to the output of said decoding sub-assembly and to the input of said encoding subassembly;

(b) connected in cascade between the output of said first subtracter and the negative input of said second subtracter, a picture memory and a circuit for motion compensation in view of displacement vectors which are representative of the motion of said current image with respect to a previous image.

In another implementation, the invention also relates to a device for transcoding coded digital signals corresponding to a sequence of images, which device comprises in cascade:

(A) a decoding sub-assembly for decoding input signals of said device which are associated with each current image;

(B) an encoding sub-assembly with an encoding output and a predicting output; said device being characterized in that it also comprises:

(C) between the output of said decoding sub-assembly and the input of said encoding sub-assembly, a prediction sub-assembly comprising:

(a) a third subtracter, the positive and negative inputs of which are respectively connected to the predicting output and to the input of said encoding sub-assembly, and a fourth subtracter, the positive input and the output of which are respectively connected to the output of said decoding sub-assembly and to the input of said encoding sub-assembly;

(b) connected in cascade between the output of said third subtracter and the negative input of said fourth subtracter, an inverse frequency transform circuit, a picture memory, a circuit for motion compensation in view of displacement vectors which are representative of the motion of said current image with respect to a previous image, and a frequency transform circuit.

In the particular case of an image distribution according to two (or more) image quality levels, said device is then characterized in that said prediction sub-assembly also comprises, between the output of the third subtracter and the input of the inverse frequency transform circuit, at least one additional encoding sub-assembly with a second encoding output and a second predicting output, said additional encoding sub-assembly being followed by a fifth subtracter, the positive and negative inputs of which are respectively connected to said second predicting output and to the output of said third subtracter, and the output of which is connected to said input of the inverse frequency transform circuit. More generally, said prediction assembly may comprise in cascade a plurality of similar encoding sub-assemblies, corresponding to the same number of image quality levels.

BRIEF DESCRIPTION OF THE DRAWING

These and other aspects of the invention will be apparent from and elucidated with reference to the embodiments described hereinafter.

In the drawings.

DETAILED DESCRIPTION OF THE PREFERRED EMBODIMENTS

These three embodiments will be described first. However, it should be noted that they only correspond to specific implementations of the invention and that other embodiments can be proposed, including, for example, a microprocessor which controls the operating process of a sequence of instructions corresponding to the action of some or all circuits provided in such embodiments. The description of these embodiments will therefore be followed by that of the steps of the transcoding method according to the invention and illustrated by these particular examples.

Figure 4:
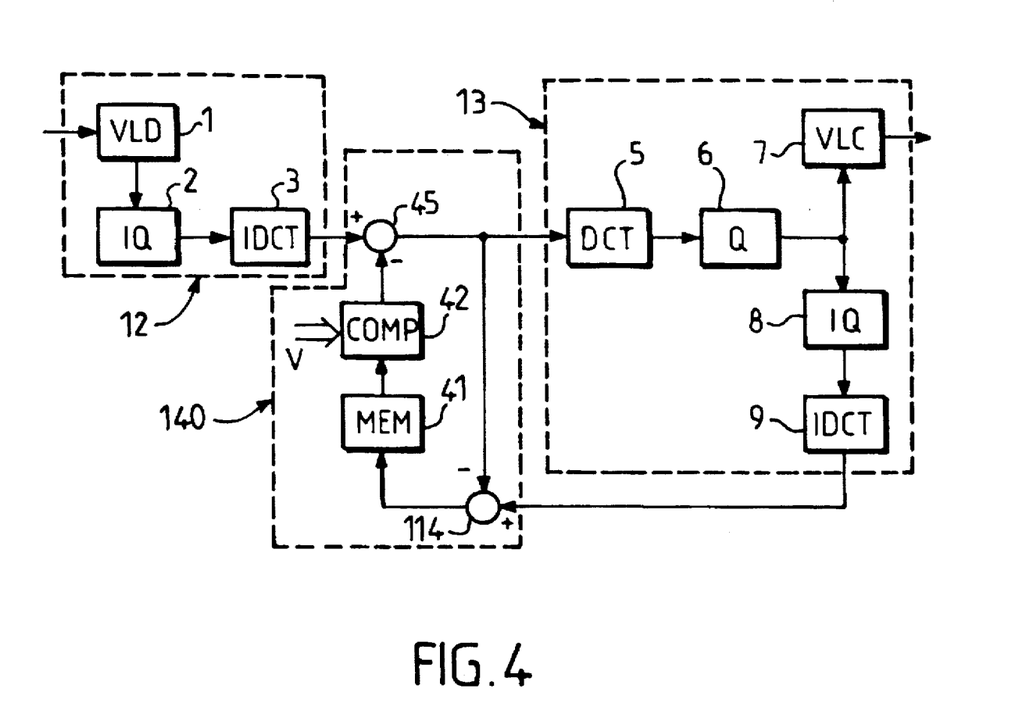
FIG. 4 shows a first embodiment of a transcoding device according to the invention.

As in the case of FIG. 3, the transcoding device shown in FIG. 4 in a first embodiment of the invention comprises the decoding channel 12, with the circuits 1, 2, 3 arranged in series, and the encoding and decoding channel 13, with the circuits 5 to 9. According to the invention, this device comprises, between these unchanged channels 12 and 13, a prediction sub-assembly 140 which comprises the following elements:

- a first subtracter 114, the positive input of which is connected to the predicting output of the channel 13 (i.e. to the output of the inverse discrete cosine transform circuit 9) and the negative input of which is connected to the input of the encoding subassembly, and a second subtracter 45, the positive input of which is connected to the output of the decoding subassembly (i.e. to the output of the inverse discrete cosine transform circuit 3) and the output of which is connected to the input of the encoding sub-assembly (i.e. to the input of the discrete cosine transform circuit 5);

arranged in cascade between the output of the first subtracter 114 and the negative input of the second subtracter 45, a picture memory 41 and a motion compensation circuit 42.

The comparison of the structure thus defined with that shown in FIG. 3 immediately shows the reduction of complexity which is obtained with the present invention: with respect to FIG. 3, one has indeed economized on one picture memory and one motion compensation circuit (and replaced one of the two adders by one subtracter).

It is to be verified that the transcoding device thus simplified nevertheless plays a role which is identical to that of the more complex device shown in FIG. 3. To this end it is useful to define the signals present at different points in the device of FIG. 3 (and thus of the decoder and the encoder of FIGS. 1 and 2). Taking the fact into account that upon encoding only difference signals between the original signals and the predicted signals are applied to the encoding channel, the decoding channel 12 also supplies a difference signal which is here referred to as residual signal $R_1(n)$ (of a picture called for instance $Im_1(n)$) so as to express its nature, in which n denotes the number (or rank) of the image concerned in the sequence of images. Based on this residual signal $R_1(n)$, a corresponding decoded image $I_1(n)$ is reconstructed by addition to $R_1(n)$ of the prediction denoted $S(I_1(n-1),V)$ which is formed from the previously decoded picture $I_1(n-1)$ by applying motion compensation in the circuit 42, this predicted picture being therefore available at the output of the motion compensation circuit 42 (the images are subdivided in macroblocks each comprising four luminance blocks and two chrominance blocks, a motion vector V is associated to each macroblock, V denotes the previously determined motion vector field with which the motion compensation is carried out with respect to the preceding image, and S denotes the shift operation with which, on the basis of $I_1(n-1)$, the predicted or motion-compensated image can be obtained by correlation, this vector field V being simply obtained by a conventional search of the block having in the preceding image the best correlation with a block of the current image).

In the encoder which follows and receives the signal $I_1(n)$, difference signals are encoded: these signals are obtained by subtracting, from $I_1(n)$, the predicted image which is available at the output of the motion compensation circuit 103 of the prediction channel of this encoder. Each residual signal resulting from this subtraction on the basis of $I_1(n)$ is referred to as $R_2(n)$, in which n always indicates the number of the original image concerned and the index 2 indicates that it is the second residual signal which is defined, and this signal $R_2(n)$ is submitted to the encoding operation.

In the same encoder, the circuits 8 and 9 carry out a decoding operation which is necessary to allow calculation of $R_2(n)$ by way of subtraction in the prediction channel. The prediction operation by motion compensation is denoted $S(I_2(n-1),V)$ where $I_2(n-1)$ denotes the image previously decoded (obtained at the output of the adder 101 and stored in the memory 102), V denotes as previously the motion vector field with which the motion compensation is carried out with respect to the preceding image, and S denotes the shift operation with which, on the basis of $I_2(n-1)$, the predicted or motion-compensated image can be obtained by correlation.

In the encoder the direct discrete cosine transform, the direct quantizing operation, the inverse quantizing operation, and the inverse discrete cosine transform are not completely reversible: they roughly introduce a relatively weak error, referred to as encoding error (or quantization error) and denoted $e_2(n)$, between the initial signal and the signal which is reconstituted after said inverse operations. Due to this fact, the residual signal denoted $R_2(n)$ at the input of the channel 13 (i.e. of the discrete cosine transform circuit 5) and intended to be encoded, after quantization, by the circuit 7 does not remain identical to itself after the operations carded out in the circuits 5 and 6 and the inverse operations carried out in the circuits 8 and 9 but becomes a signal $R_2(n)+e_2(n)$, or reconstructed residual picture. At the output of the adder 101, the image $I_2(n)$ before prediction is thus not $I_2(n)=I_1(n)$, which would be the case without said encoding error, but $I_2(n) = I_1(n)+e_{2(n)}$.

Figure 5:
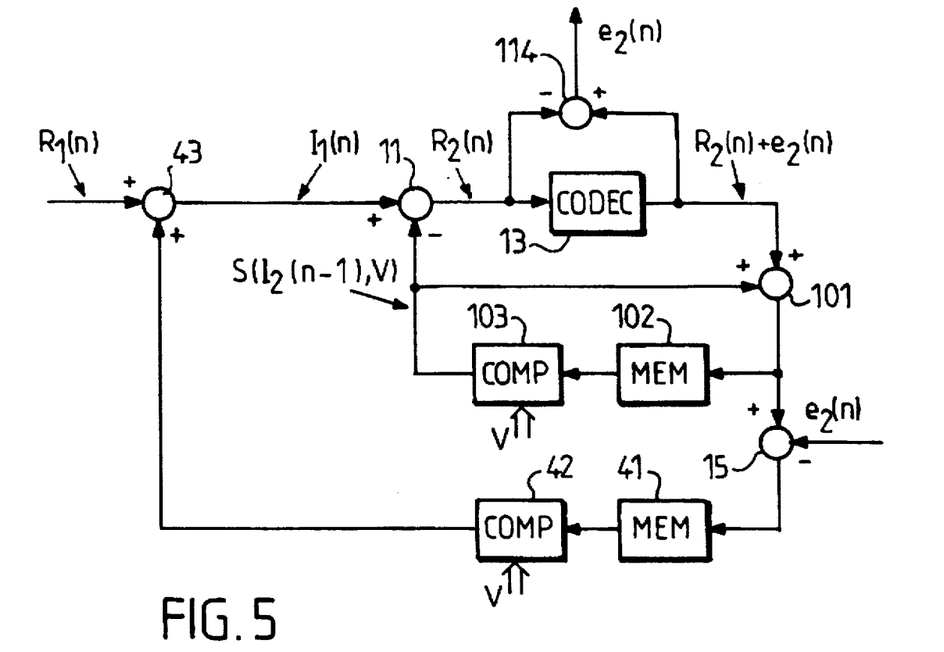
FIGS. 5 to 7 show transcoder structures equivalent to that of FIG. 4.

As shown in FIG. 5, this encoding error $e_2(n)$ can be calculated by arranging a subtracter (it will hereinafter be apparent that this subtracter is the subtracter 114) between the output and the input of the channel 13 at which the signals $(R_2(n)+e_2(n)$, and $R_2(n)$, respectively, are present. Therefore, with $e_2(n)$ being known on the one hand and the signal $I_1(n)+e_2(n)$ being present on the other hand at the output of the adder 101, it is possible to arrange at the output of this adder a subtracter 15 whose positive input receives this signal $I_1(n) +e_2$ (n) and whose negative input receives the ouput signal from the subtracter 114, i.e. $e_2$ (n). The output of the subtracter 15 then supplies $I_1$ (n), and instead of being connected, as in FIG. 3, to the output of the adder 43 conveying the signal $I_1(n)$ reconstructed by prediction, the input connection of the picture memory 41 of the motion compensation stage 4 may then be connected, as shown in FIG. 5, to the ouput of this subtracter 15 which also conveys the signal $I_1(n)$ but which is this time reconstituted by elimination of the encoding error $e_2(n)$. The structure of FIG. 5 is thus equivalent to that of FIG. 3 which may be substituted thereby.

A further substitution can then be carded out. The ouput of the motion compensation circuit 42 may be conventionally denoted as $S(I_1(n-1),V)$, an expression in which $I_1(n-1)$ denotes the preceding image which has been treated and restituted when the current image at the output of the adder 43 is $I_1(n)$ (which is the case shown in the Figures), while, as previously indicated, V denotes the motion vector field and S denotes the shift operation with which, on the basis of $I_1(n-1)$, the predicted or motion-compensated image is obtained by correlation.

It will be evident that such a motion compensation operation, which consists of the search, in the (or a) previous image, of a block providing the best correlation with the connecting these blocks, is linear. Therefore, the current block of the current image and of a shift corresponding to the motion vector connecting these blocks, is linear. Therefore, the following expressions can be written in the prediction channel whose input signal is the signal $I_2(n)=I_1(n)+e_2(n)$ because of the encoding error:

$$S(I_2(n),V)=S((I_1(n)+e_2(n)),V) \qquad (1)$$

or, for the preceding image:

$$S(I_2(n-1),V)=S((I_1(n-1)+e_2(n-1)),V) \qquad (2)$$

or, when using the linearity property:

$$S((I_1(n-1)+e_2(n-1)),V)=S(I_1(n-1),V)+S(e_2(n-1),V) \qquad (3)$$

In this expression (3), the term $S(I_1(n-1),V)$, in the case where the current image reconstituted at the output of the adder 43 is $I_1(n)$, constitutes the signal which is present at the compensated input of this adder (i.e. at the output of the motion compensation circuit 42 of the stage 4). Based on expression (2) and using the linearity property similarly as for expression (3), this output signal of the circuit 42 can thus be written as:

$$S(I_1(n-1),V)=S(I_1(n-1),V)+S(e_2(n-1),V) \qquad (4)$$

Figure 6:
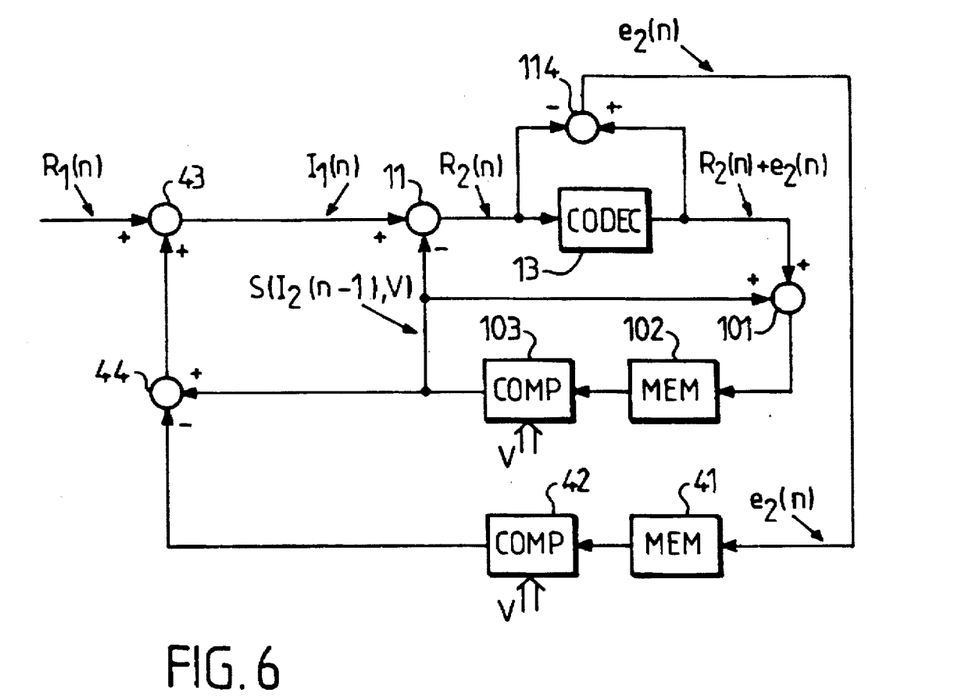

The term $S(I_2(-n1),V)$ is known because it concerns the output signal of the motion compensation circuit 103 when the input signal of the picture memory 102 is $I_2(n-1)$. The term $S(e_2(n-1),V)$ can be obtained from a point of the transcoder where the encoding error is available (as has been seen, this point exists because said encoding error is available at the output of the subtracter 114) and by providing, subsequent to this point, another prediction channel comprising, in series, a picture memory (for storing the signals of the type $e_2(n-1)$) and a motion compensation circuit (for effecting the operation $S(e_2(n-1),V)$). With reference to FIG. 6 described hereinafter, it will be seen that this prediction channel actually already exists.

The new structure obtained in this manner is shown in FIG. 6 which is derived from FIG. 5 by omitting the subtracter 15 and the connection between the output of the adder 101 and the positive input of this subtracter and by introducing a subtracter 44 at the output of the circuit 42. The positive input of this subtracter 44 receives the output signal $S(I_2(n-1),V)$ of the motion compensation circuit 103 (a supplementary connection as compared with FIG. 5 is created for this purpose) and its negative input receives the output signal $S(e_2(n-1),V)$ of the additional prediction channel mentioned hereinbefore, which is constituted by using the preceding picture memory 41 and the motion compensation circuit 42 again and by simply connecting the input of the memory 41 to the output of the subtracter 114.

Figure 7:
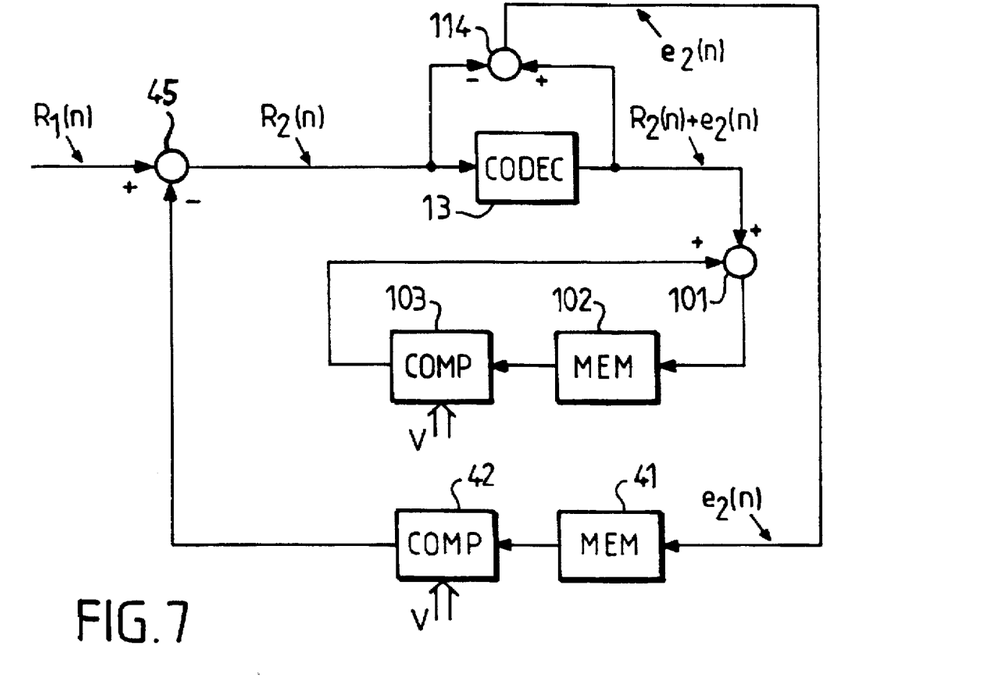

It will now be shown that a new simplification of the structure of FIG. 6, leading to the structure of FIG. 7, can be realized. In this FIG. 6, the signal $R_2(n)$ is obtained in conformity with the following expression (5):

$$R_2(n)=I_1(n)-S(I_2(n-1),V) \qquad (5)$$

or:

$$R_2(n)=R_1(n)+S(I_1(n-1),V)-S(I_2(n-1),V) \qquad (6)$$

However, it is known that, in accordance with expression (4), the signal $S(I_1(n-1),V)$ present at the output of the subtracter 44 is equivalent to and can be replaced by $S(I_2(n-1),V)-S(e_2(n-1),V)$, which, on the basis of expression (6), leads to the simplified expression (7)

$$R_2(n)=R_1(n)-S(e_2(n-1),V) \qquad (7)$$

On the one hand this means that the residual signal $R_2(n)$ can be directly calculated on the basis of the residual signal $R_1(n)$ without an intermediate image reconstitution. As shown in FIG. 7, this provides the possibility of omitting the subtracter 11 of FIG. 6 and the connection which leads to its negative input. On the other hand this means that this residual signal $R_2(n)$ present at the input of the channel 13 is from now on simply obtained by subtracting the quantity $S(e_2(n-1),V)$ from the residual signal $R_1(n)$: as shown in FIG. 7, it provides therefore the possibility of omitting the subtracter 44 of FIG. 6 as well as the connection leading to its positive input and the possibility of directly connecting the old negative input of this subtracter 44 (which is now omitted) to the negative input of a new subtracter 45 instead of the adder 43 (which is also omitted), this subtracter replacing the adder 43.

In FIG. 7, the other elements 13, 114, 41, 42, 101, 103, 103 theoretically remain identical. However, it will be clear that, with a view of this Figure, the elements 101, 102, 103 are no longer useful because the loop thus formed does not send any signals anywhere. These elements 101 to 103 may thus be omitted without modifying the rest of the structure in whatever way and said omission leads to the device according to the invention, as shown in FIG. 4 (completely, i.e. with the channels 12 and 13 explicitly represented).

The comparison of the structure of FIG. 4 with that of FIG. 3 clearly shows the reduction of complexity to which the proposed technical solution leads. As compared with the structure of FIG. 3 a picture memory and a motion compensation circuit have indeed been omitted. It may further be noted that one of the two adders has been replaced by a subtracter.

The present invention is not limited to this embodiment, from which modifications can be deduced without departing from the scope of the invention.

Figure 8:
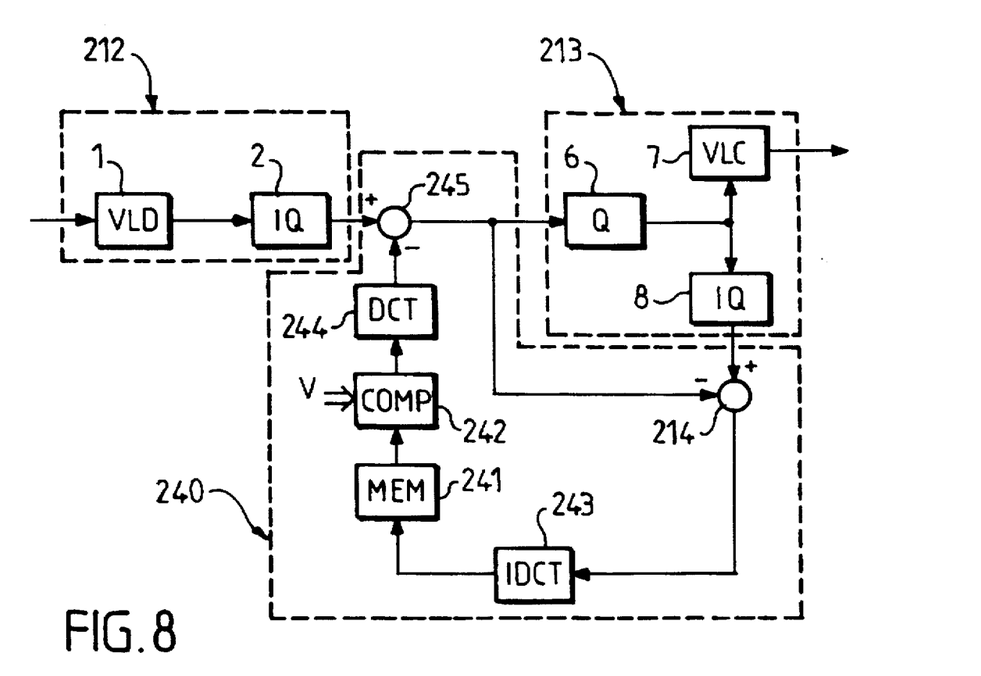
FIG. 8 shows a second embodiment of a transcoding device according to the invention.

FIG. 8 in particular shows a second embodiment of a transcoding device according to the invention. As compared with FIG. 4 there are the following differences:

(1) the decoding channel, this time denoted by the reference numeral 212 (instead of the reference numeral 12 in FIG. 4), only comprises the variable length decoding circuit 1 and the inverse quantizing circuit 2;

(2) the encoding and decoding channel denoted by the reference numeral 213 (instead of the reference numeral 13 in FIG. 4) only comprises the quantizing circuit 6, the variable length encoding circuit 7 and the inverse quantizing circuit 8;

(3) the prediction sub-assembly denoted by the reference numeral 240 (instead of the reference numeral 140 in FIG. 4) now comprises:

(a) a subtracter 245 between the output of the channel 212 and the input of the channel 213;

(b) a subtracter 214 at the outputs of this subtracter 245 and the channel 213;

(c) in series between the output of the subtracter 214 and the negative input of the subtracter 245, a picture memory 241 and a motion compensation circuit 242;

(d) in addition to these elements 214, 241, 242, 245 similar to the corresponding elements 114, 41, 42, 45 of FIG. 4, an inverse frequency transform circuit, for instance an inverse orthogonal transform one such as an inverse discrete cosine transform circuit 243 arranged in series between the output of the subtracter 214 and the input of the memory 241, and a frequency transform circuit, for instance an orthogonal transform one such as a discrete cosine transform circuit 244 arranged in series between the output of the motion compensation circuit 242 and the negative input of the subtracter 245.

With this structure of the transcoding device, one remains permanently within the frequency domain all along the decoding channel (circuits 1 and 2), as well as within the encoding and decoding channels (circuits 6, 7 and 8). In order to compensate for this omission of the circuits 3 and 5, while taking into account that the motion compensation operations are carded out in the spatial domain instead of in the frequency domain, it is necessary to reintroduce the circuits denoted by the reference numerals 243 and 244 in the prediction sub-assembly, which circuits make it possible to return to the spatial domain for the motion compensation, thanks to the circuit 242, and subsequently again to the frequency domain as soon as this motion compensation has been realized. The transcoding device thus proposed only contains one inverse frequency transform circuit instead of two, as in the embodiment of FIG. 4, which constitutes another reduction of complexity.

Figure 9:
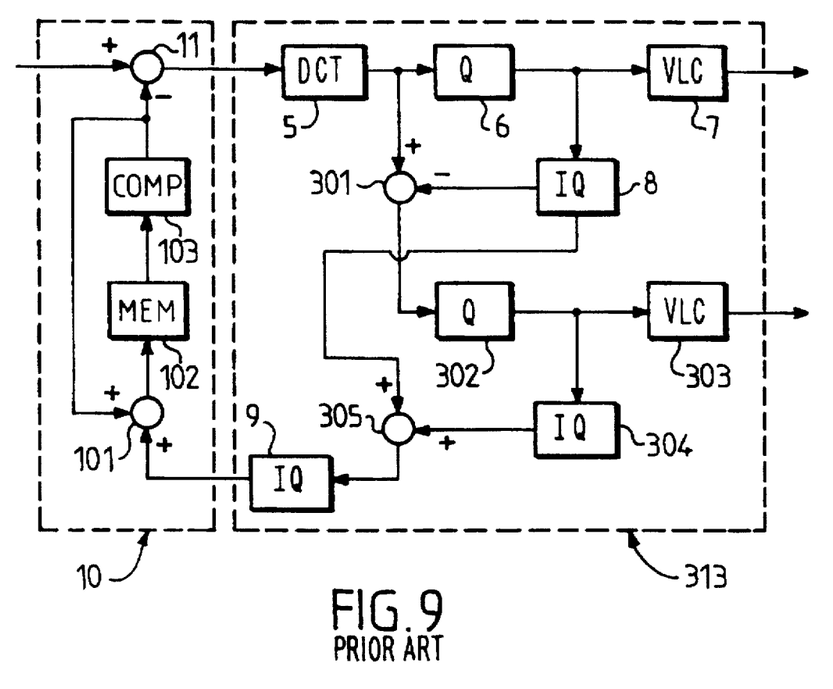
FIG. 9 shows an example of a conventional encoder with two image quality levels.
Figure 10:
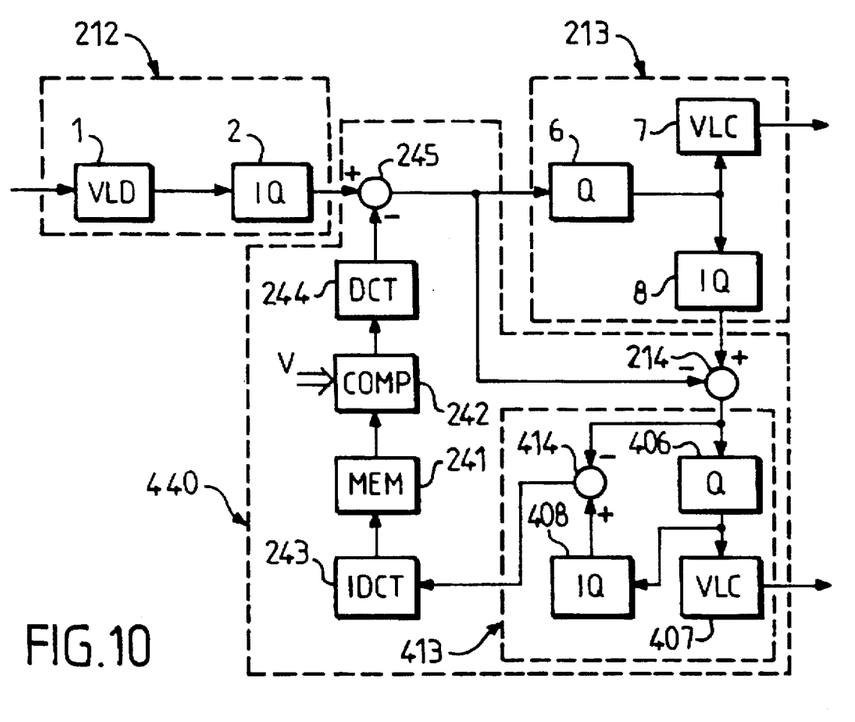
FIG. 10 shows, in that kind of application, a third embodiment of a transcoding device allowing conversion of an input data stream into two output data streams, according to two image quality levels.

The third embodiment described and shown in FIG. 10 corresponds to an image distribution according to several image quality levels (for example, two levels). It is known that such an encoding scheme has been selected within the frame of the MPEG-2 standard: FIG. 9 shows an example of an encoder with two image quality levels. This two-layer encoder comprises:

(1) on the one hand, the elements 5, 6, 7, 8, 9, 11, 101, 102, 103 of FIG. 2, in order to supply a first MPEG-2-like data stream with a standard image quality;

(2) on the other hand, additional elements allowing implementation of a quantization refinement technique that leads to an improved quality encoding and a more precise prediction, said additional elements comprising:

(a) a subtracter 301 between the signals before the quantization step and after the inverse quantization step which follows it;

(b) a second quantizing circuit 302 followed by a second variable length encoding circuit 303;

(c) in cascade at the output of circuit 302, a second inverse quantizing circuit 304 and an adder 305, the second output of which is the output of the first inverse quantizing circuit 8 and the output of which is the input of the inverse discrete cosine transform circuit 9.

The decoder corresponding to such an encoder may be either a conventional decoder with a standard quality, comprising in cascade a memory, a variable length decoder, an inverse quantizing circuit and an inverse frequency transform circuit (here, an inverse discrete cosine transform circuit), or a decoder with an improved quality, comprising in each of two parallel channels a memory, a variable length decoder and an inverse quantizing circuit. An adder is provided between the outputs of these two channels and the input of the inverse discrete cosine transform circuit.

The present invention is compatible with such an encoding scheme having two image quality levels, or more generally with an encoding scheme having several ones. FIG. 10 shows a third embodiment of a transcoding device allowing conversion of an input data stream into two output data streams with two image quality levels. This device comprises:

(1) on the one hand, the same elements 212 and 213 as in FIG. 8, in order to obtain a first output data stream corresponding to images with a low quality;

(2) on the other hand, a prediction sub-assembly 440 comprising:

(a) the same elements 214, 241, 242, 243, 244, 245, as in FIG. 8;

(b) between the output of the subtracter 214 and the input of the inverse discrete cosine transform circuit 243, an additional encoding and decoding channel 413 comprising, in a similar way as for the channel 213, a quantizing circuit 406 and a variable length encoding circuit 407 (denoted Q and VLC as previously) followed, at the output of said circuit 406, by an inverse quantizing circuit 408 (denoted IQ) and then by a second subtracter 44.

The output of the encoding circuit 407 is the second output of the transcoding device, with which said second data stream corresponding to images with an improved quality can be obtained. The positive input of the subtracter 414 is connected to the output of the inverse quantizing circuit 408, its negative input to the output of the subtracter 214, and its output to the input of the inverse discrete cosine transform circuit 243.

The three embodiments of a transcoding device which have just been described allow clear understanding of the basic principle of the invention, in which it is proposed to omit expensive steps of a transcoding method.

It has been previously seen that a transcoding method comprises in cascade a decoding part, including a decoding step followed by a motion compensation step, and an encoding part, including an encoding and decoding step and a prediction step. The decoding step comprises itself in series a variable length decoding sub-step, an inverse quantizing sub-step and an inverse frequency transform sub-step. The encoding and decoding step comprises, in series, a frequency transform sub-step and a quantizing sub-step followed, in parallel, on the one hand by a variable length encoding sub-step and on the other hand by an inverse quantizing sub-step and an inverse frequency transform sub-step in series. The motion compensation step as well as the prediction step comprise a signal storing sub-step followed by a motion compensation sub-step.

The method according to the invention consists in that there are no longer two steps, as in the previous case, but only one signal storing sub-step. Such a situation is obtained by inserting, between said decoding step and said encoding and decoding step, a modified prediction step comprising in series a first subtracting sub-step between the signals before quantization and the signals after inverse quantization, a storing sub-step of the obtained signals, a motion compensation sub-step between the current image and a previous image, and a second subtracting sub-step between the decoded signals which have to be encoded and the compensated signals, said motion compensation step and said original prediction step being no longer provided.

The previous description of several embodiments of the invention has helped to understand the advantage of this method. By providing within the modified prediction step an additional sub-step for converting frequential signals into spatial signals, thanks to an inverse frequency transform sub-step taking place between said first subtracting sub-step and said storing sub-step, and an inverse additional sub-step for converting spatial signals into frequential signals, thanks to a frequency transform sub-step taking place between said motion compensation sub-step and said second subtracting sub-step, the method leads to a better reduction of complexity, since such additions of transforms allow omission of the inverse frequency transform sub-step of the decoding sub-step and the frequency and inverse frequency transforms of the encoding sub-step.

Finally it should be noted that, as previously shown, the method may be used for distributing images according to several image quality levels (generally according to two quality levels). The lower quality corresponds to signals which are available after the variable length encoding sub-step has been executed. In order to obtain at least one level with a better image quality, at least one additional encoding step is necessary. Such an additional step, provided between the first subtracting sub-step between the signals before quantization and the signals after inverse quantization and the sub-step for converting frequential signals into spatial signals, comprises a second quantizing sub-step, followed in parallel on the one hand by a second variable length encoding sub-step and on the other hand by two sub-steps provided in series, the first one being a third inverse quantizing sub-step and the second one a second subtracting sub-step between the signals before quantization and the signals after this third inverse quantization. Further quality levels with increasing quality may be obtained by repeating similar encoding sub-steps provided in cascade.

I claim:

1. A method of transcoding coded digital signals corresponding to a sequence of images, which method comprises a decoding step of the input digital signals which are associated with each current image, followed by an encoding step, said method being characterized in that it also comprises, between said decoding and encoding steps, a prediction step comprising in cascade:

(a) a first subtracting sub-step provided for determining an encoding error during said encoding step;

(b) a storing sub-step of said encoding error;

(c) a motion compensation sub-step between said current image and a previous image;

(d) a second subtracting sub-step between the decoded signals obtained after said decoding step and the motion-compensated signals obtained after said motion compensation sub-step, the output of said second subtracting sub-step corresponding to the input of said encoding step.

2. A method as claimed in claim 1, in which the decoding step comprises in cascade a variable length decoding sub-step, a first inverse quantizing sub-step and a first inverse frequency transform sub-step, and the encoding step comprises in cascade a frequency transform sub-step and a quantizing sub-step followed in parallel on the one hand by a variable length encoding sub-step and on the other hand by a second inverse quantizing sub-step and a second inverse frequency transform sub-step provided in cascade, characterized in that the first subtracting sub-step is provided between the signals before said frequency transform sub-step and the signals after said second inverse frequency transform sub-step.

3. A method of transcoding coded digital signals corresponding to a sequence of images, which method comprises a decoding step of the input digital signals which are associated with each current image, followed by an encoding step, said method being characterized in that it also comprises, between said decoding and encoding steps, a prediction step comprising in cascade:

(a) a first subtracting sub-step provided for determining an encoding error during said encoding step;

(b) a first sub-step for converting frequential signals into spatial signals;

(c) a storing sub-step of the signals obtained after said first converting sub-step;

(d) a motion compensation sub-step between the current image and a previous image;

(e) a second sub-step for converting spatial signals into frequential signals (f) a second subtracting sub-step between the decoded signals obtained after said decoding step and the signals obtained after said second convening sub-step, the output of said second subtracting sub-step corresponding to the input of said encoding step.

4. A method as claimed in claim 3, in which the decoding step comprises in cascade a variable length decoding sub-step and a first inverse quantizing sub-step, and the encoding step comprises in cascade a first quantizing sub-step followed in parallel on the one hand by a first variable length encoding sub-step and on the other hand by a second inverse quantizing sub-step, characterized in that the first subtracting sub-step is provided between the signals before said first quantizing sub-step and the signals after said second inverse quantizing sub-step.

5. A method as claimed in claim 4, characterized in that it also comprises, between said first subtracting sub-step and said sub-step for converting frequential signals into spatial signals, at least one additional encoding step, comprising a second quantizing sub-step followed in parallel on the one hand by a second variable length encoding sub-step and on the other hand by a third inverse quantizing sub-step followed by a third subtracting sub-step between the signals before said second quantizing sub-step and the signals after said third inverse quantizing sub-step.

6. A device for transcoding coded digital signals corresponding to a sequence of images, which device comprises in cascade:

(A) a decoding sub-assembly for decoding input signals of said device which are associated with each current image;

(B) an encoding sub-assembly with an encoding output and a predicting output; said device being characterized in that it also comprises:

(C) between the output of said decoding sub-assembly and the input of said encoding sub-assembly, a prediction sub-assembly comprising:

(a) a first subtracter, the positive and negative inputs of which are respectively connected to the predicting output and to the input of said encoding subassembly, and a second subtracter, the positive input and the output of which are respectively connected to the output of said decoding sub-assembly and to the input of said encoding subassembly;

(b) connected in cascade between the output of said first subtracter and the negative input of said second subtracter, a picture memory and a circuit for motion compensation in view of displacement vectors which are representative of the motion of said current image with respect to a previous image.

7. A device for transcoding coded digital signals corresponding to a sequence of images, which device comprises in cascade:

(A) a decoding sub-assembly for decoding input signals of said device which are associated with each current image;

(B) an encoding sub-assembly with an encoding output and a predicting output;

ssaid device being characterized in that it also comprises:

(C) between the output of said decoding sub-assembly and the input of said encoding sub-assembly, a prediction sub-assembly comprising:

(a) a third subtracter, the positive and negative inputs of which are respectively connected to the predicting output and to the input of said encoding subassembly, and a fourth subtracter, the positive input and the output of which are respectively connected to the output of said decoding sub-assembly and to the input of said encoding subassembly;

(b) connected in cascade between the output of said third subtracter and the negative input of said fourth subtracter, an inverse frequency transform circuit, a picture memory, a circuit for motion compensation in view of displacement vectors which are representative of the motion of said current image with respect to a previous image, and a frequency transform circuit.

8. A transcoding device as claimed in claim 7, characterized in that said prediction sub-assembly also comprises, between the output of the third subtracter and the input of the inverse frequency transform circuit, at least one additional encoding subassembly with a second encoding output and a second predicting output, said additional encoding subassembly being followed by a fifth subtracter, the positive and negative inputs of which are respectively connected to said second predicting output and to the output of said third subtracter, and the output of which is connected to said input of the inverse frequency transform circuit.

9. A transcoding device as claimed in claim 8, characterized in that said prediction sub-assembly comprises in cascade a plurality of similar encoding sub-assemblies, corresponding to the same number of image quality levels.

10. A method of transcoding coded digital signals corresponding to a sequence of images, which method comprises the steps of:

receiving an input digital signal corresponding to a sequence of images;

decoding the input digital signal;

subtracting a predicted signal from the decoded input digital signal to a provide a third signal;

encoding the third signal to provide an encoded signal;

decoding the encoded signal to provide a fourth signal;

subtracting the third signal from the fourth signal to provide a fifth signal; and motion compensating the fifth signal to provide the predicted signal.

11. The method in accordance with claim 10, wherein the step of decoding the input digital signal comprises the steps of:

variable length decoding the input digital signal, inverse quantizing the variable length decoded signal, inverse frequency transforming the inverse quantized signal, and wherein the step of encoding comprises the steps of:

frequency transforming the third signal;

quantizing the frequency transformed signal and then in parallel:

i) variable length encoding the quantized signal and ii) inverse quantizing and then inverse frequency transforming the quantized signal to provide the fourth signal.

\* \* \* \* \*